United States Patent
Kazmierski et al.

(10) Patent No.: US 9,864,254 B2
(45) Date of Patent: Jan. 9, 2018

(54) DEVICE FOR GENERATING A MODULATION OF AN OPTICAL SIGNAL COMPRISING ELECTRO-ABSORPTION MODULATORS

(71) Applicant: Commissariat à l'énergie atomique et aux énergies alternatives, Paris (FR)

(72) Inventors: Christophe Kazmierski, Marcoussis (FR); David Carrara, Marcoussis (FR)

(73) Assignee: COMMISSARIAT Á L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/439,375

(22) PCT Filed: Oct. 31, 2012

(86) PCT No.: PCT/FR2012/052539
§ 371 (c)(1),
(2) Date: Apr. 29, 2015

(87) PCT Pub. No.: WO2014/068197
PCT Pub. Date: May 8, 2014

(65) Prior Publication Data
US 2015/0316829 A1  Nov. 5, 2015

(51) Int. Cl.
*G02F 1/225* (2006.01)
*G02F 1/17* (2006.01)
(Continued)

(52) U.S. Cl.
CPC ............ *G02F 1/2257* (2013.01); *G02F 1/015* (2013.01); *G02F 1/17* (2013.01); *G02F 1/225* (2013.01);
(Continued)

(58) Field of Classification Search
CPC ............................... G02F 1/015; G02F 1/2257
See application file for complete search history.

(56) References Cited

U.S. PATENT DOCUMENTS 5,963,567 A * 10/1999 Veselka ................. G02F 1/0327
372/21
6,122,414 A 9/2000 Shimizu
(Continued)

OTHER PUBLICATIONS

International Search Report for PCT/FR2012/052539 dated Jun. 19, 2013.
(Continued)

*Primary Examiner* — Omar R Rojas
(74) *Attorney, Agent, or Firm* — B. Aaron Schulman, Esq.; Stites & Harbison PLLC

(57) ABSTRACT

A device for generating a modulation of an optical signal is provided which has a first electro-absorption modulator including a first P-doped semi-conductor area, a first N-doped semi-conductor area, and a first active portion, along with a second electro-absorption modulator including a second P-doped semi-conductor area in electric contact with the first N-doped semi-conductor area, a second N-doped semi-conductor area, and a second active portion, and a connector for introducing electric modulation. In the device, the connector for introducing electric modulation is in contact with the first N-doped semi-conductor area and the second P-doped semi-conductor area.

13 Claims, 3 Drawing Sheets

Figure 1:
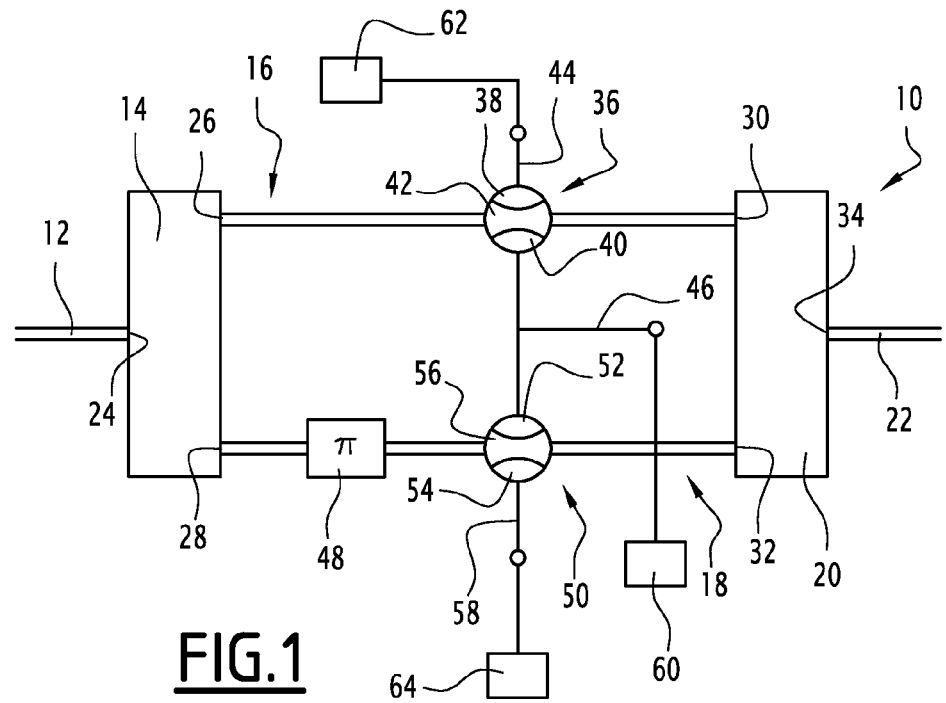

(51) Int. Cl.
*G02F 1/015* (2006.01)
*G02F 1/21* (2006.01)
(52) U.S. Cl.
CPC ............... *G02F 2001/0155* (2013.01); *G02F 2001/212* (2013.01)

(56) References Cited

U.S. PATENT DOCUMENTS

| | | |
|---|---|---|
| 6,281,030 B1 | 8/2001 | Shimizu |
| 2002/0071622 A1* | 6/2002 | Betts ................ G02F 1/2257 385/2 |
| 2003/0030882 A1 | 2/2003 | Garrett et al. |
| 2004/0201079 A1* | 10/2004 | Scott ................. G02F 1/2257 257/603 |
| 2005/0157368 A1 | 7/2005 | Vang et al. |
| 2008/0231933 A1 | 9/2008 | Doerr |

OTHER PUBLICATIONS

Written Opinion of the International Searching Authority for PCT/FR2012/052539 dated Jun. 19, 2013.

Inuk Kang: "Phase-shift-keying and on-off keying with improved performances using electroabsorption modulators with interferometric effects", Optics Express, OSA (Optical Society of America), Washington DC, (US), vol. 15, No. 4, (Feb. 19, 2007), pp. 1467-1473.

Christophe Kazmierski: "Electro-absorption-based fast photonic integrated circuit sources for next network capacity scaling [invited]", IEEE/OSA Journal of Optical Communications and Networking, IEEE, USA, vol. 4, No. 9, (Sep. 1, 2012), pp. A8-A16.

\* cited by examiner

DEVICE FOR GENERATING A MODULATION OF AN OPTICAL SIGNAL COMPRISING ELECTRO-ABSORPTION MODULATORS

The invention relates to a device for generating a modulation of an optical signal comprising electro-absorption modulators. The invention also relates to an optical circuit comprising the device for generating a modulation. The invention also relates to a method for manufacturing the optical circuit. The invention also relates to a use of the device for generating a modulation or of the optical circuit for achieving vectorial modulation.

In present telecommunications systems, vectorial modulation formats are increasingly used. Quadrature phase-shift keying modulation is a usual example of vectorial modulation.

Quadrature phase-shift modulation is often known under the name of 4-PSK or QPSK for <<quadrature phase-shift keying>>. This modulation uses a constellation diagram with four equidistant points around a circle. QPSK modulation makes possible coding with two bits per symbol which gives the possibility of obtaining a better band width than modulation allowing coding with only a single bit per symbol.

In order to make a device for generating a modulation of an optical signal able to produce QPSK modulation, the use of devices is known comprising several phase modulators of the Mach-Zehnder type. These layouts are based on the technology with lithium niobate (chemical formula $LiNbO_3$).

It has been shown that such devices imply relatively large sizes of several tens of millimeters and an electric power consumption of its associated control and monitoring circuit of the order of several watts (for example 10 watts).

Further, these devices have a need for energy which increases with the flow rate. Consequently, these devices are not well adapted for operation in networks for which the communication throughputs are greater than 25 gigabauds.

In order to find a remedy to these drawbacks, a device for generating a modulation of an optical signal having a layout of the Mach-Zehnder type and including two electro-absorption modulators is known from document US-A-2008/0231933.

However, the device for generating a modulation of an optical signal proposed in this document is complex to implement, notably because many components (resistors, inductors in particular) are involved.

Therefore there exists a need for a device for generating a modulation of an optical signal allowing a simplified implementation.

According to the invention, this object is achieved with a device for generating a modulation of an optical signal comprising a first electro-absorption modulator. The first electro-absorption modulator includes a first P-doped semi-conductor area, a first N-doped semi-conductor area and a first active portion connecting both first semi-conductor areas. The device for generating a modulation also comprises a second electro-absorption modulator. The second electro-absorption modulator includes a second P-doped semi-conductor area in electrical contact with the first N-doped semi-conductor area, a second N-doped semi-conductor area and a second active portion (56) connecting both second semi-conductor areas. The device for generating a modulation of an optical signal also comprises a connector for introducing electric modulation. The connector for introducing electric modulation is in contact with the first N-doped semi-conductor area and the second P-doped semi-conductor area.

According to particular embodiments, the device comprises one or more of the following features, taken individually or according to any technically possible combination:
- the first electro-absorption modulator comprises a first connector for introducing a DC voltage, the first P-doped semi-conductor area being connected to the first connector for introducing a DC voltage.
- the second electro-absorption modulator comprises a second connector for introducing a DC voltage, the second N-doped semi-conductor area being connected to the second connector for introducing a DC voltage.
- the device for generating a modulation includes a modulated voltage generator connected to the connector for introducing an electric modulation.
- the modulated voltage generator is adapted for applying a sinusoidal modulation.
- the modulated voltage generator is adapted for applying a square-wave modulation.
- the modulated voltage generator is adapted for applying a periodic modulation.
- the device for generating a modulation includes a first DC voltage source connected to the first connector for introducing a DC voltage.
- the device for generating a modulation includes a second DC voltage source connected to the second connector for introducing a DC voltage.
- both DC voltage sources are able to deliver an opposite voltage.
- the modulated voltage generator is able to apply a voltage modulation, the average voltage of which is equal to the difference in potential between the DC voltage delivered by the second DC voltage source and the DC voltage delivered by the first voltage source divided by two.
- the modulated voltage generator is able to apply a voltage modulation, the average voltage of which is equal to the voltage of the intersection point of the [optical transmission—voltage of the first electro-absorption modulator] characteristic with the [optical transmission—voltage of the second electro-absorption modulator] characteristic.
- the device for generating a modulation further includes a DC voltage source connected to the first connector for introducing a DC voltage, the second connector for introducing a DC voltage being connected to ground.
- the device for generating a modulation comprises a load, the load being connected to the electric ground of the device for generating a modulation and to the connector for introducing an electric modulation.
- the load is a resistor.
- the load is a resistor in series with a capacitor.

The invention also relates to an optical circuit including at least one device for generating a modulation of an optical signal as described earlier and a light source able to inject light into the device(s) for generating a modulation.

According to a particular embodiment of the optical circuit, the light source is a distributed feedback laser.

The invention also relates to a method for manufacturing the optical circuit as described earlier, the method comprising the steps for making semi-conductor areas of the device for generating a modulation and for making semi-conductor areas of the light source. The manufacturing method also includes a step for making at most six electric connections between semi-conductor areas of the device for generating a modulation and the semi-conductor areas of the light source.

According to a particular embodiment of the method, the electric connections are metal contacts.

The invention also relates to a use of a device for generating a modulation of an optical signal as described earlier or of an optical circuit as described earlier for achieving vectorial modulation.

According to particular embodiments, the use comprises one or more of the following features, taken individually or according to any technically possible combination:
the vectorial modulation is a binary phase-shift modulation (BPSK modulation).
The vectorial modulation is a phase- and amplitude-shift modulation.
the modulation is a QPSK modulation.
the modulation is a QAM (<<Quadrature Amplitude Modulation>>) modulation.

Figure 2:
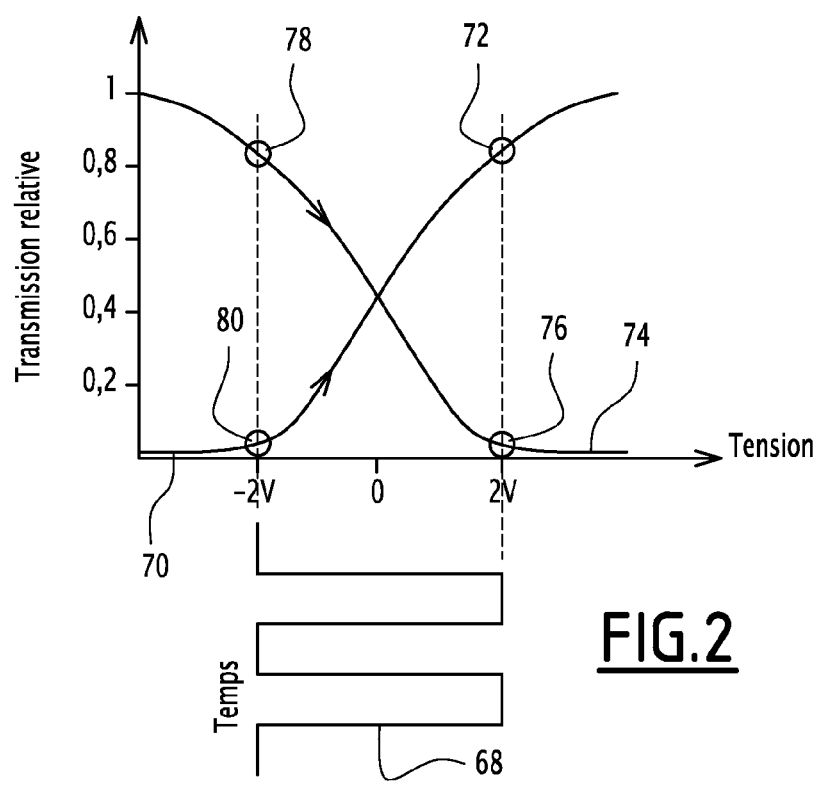
Figure 3:
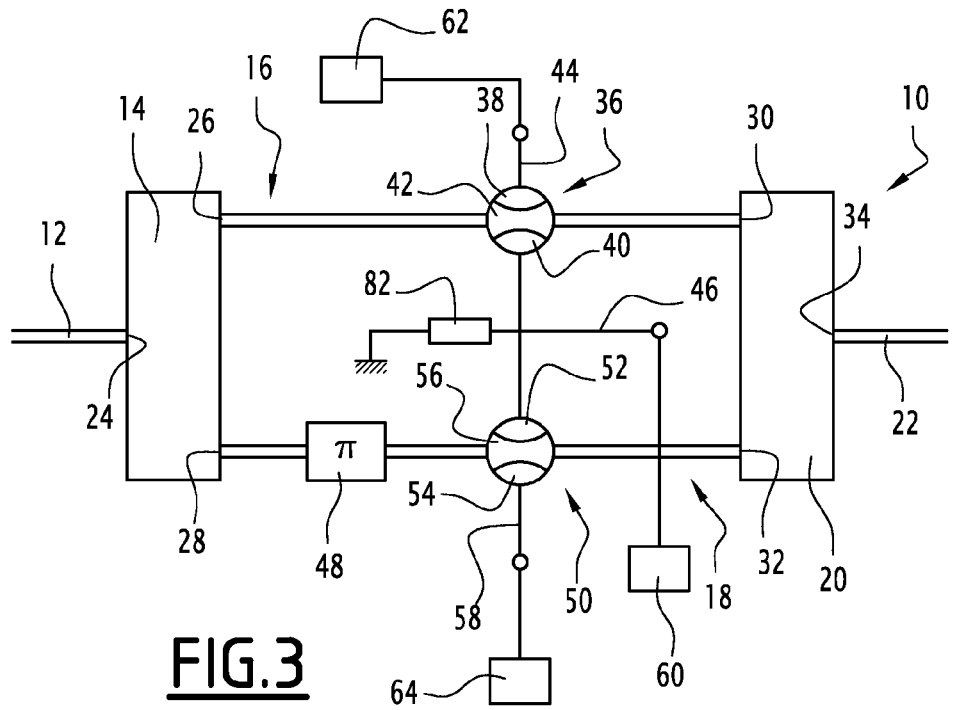
Figure 4:
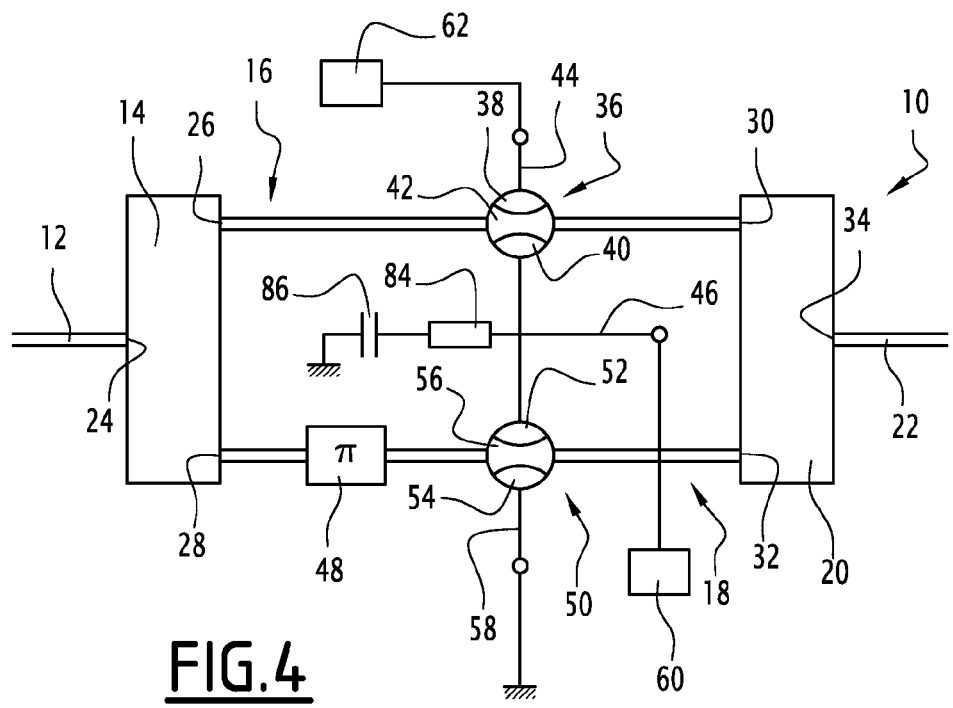
Figure 5:
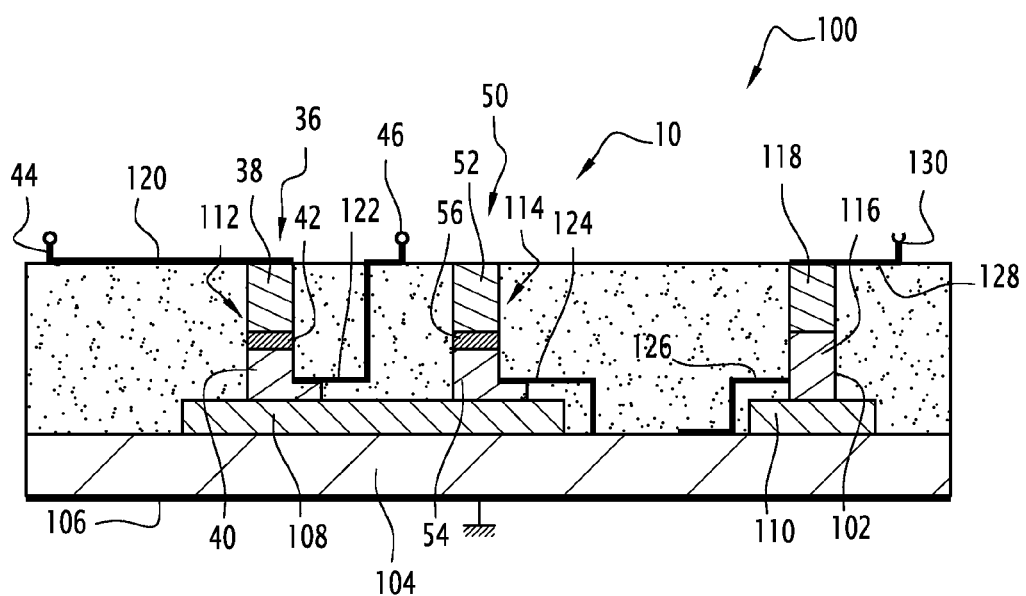

Other features and advantages of the invention will become apparent upon reading the description, which follows, of an embodiment of the invention, only given as an example and with reference to the drawings which are:

FIG. 1, a schematic illustration of a device for generating a modulation of an optical signal according to a first embodiment of the invention, FIG. 2, a graph illustrating the optical transfer function of the modulation device of FIG. 1 versus the applied modulation voltage, FIG. 3, a schematic view of an exemplary modulation device according to a second embodiment, FIG. 4, a schematic view of an exemplary optical circuit including a laser and a modulation device according to a third embodiment of the invention, and FIG. 5, a schematic sectional view of a portion of the optical integrated circuit of FIG. 4.

In all the following, the terms of <<upstream>> and <<downstream>> are generally meant relatively to the direction of propagation of the light.

The device for generating a modulation of an optical signal 10 illustrated in FIG. 1 shows a layout of a Mach-Zehnder interferometer. The device for generating a modulation 10 is designated in the following under the term of <<modulation device 10>>.

The modulation device 10 successively comprises from the upstream to the downstream side, an input waveguide 12, a beam-splitter 14, two arms 16, 18, a means for recombination 20 and an output waveguide 22.

The beam-splitter 14 is a multimode interference coupler. Such a coupler is often designated under the name of MMI coupler. The acronym MMI refers to <<multimode interferences>>.

The beam-splitter 14 is provided with input 24 and two outputs 26, 28. The input 24 of the beam-splitter 14 is connected to the input waveguide 12 while the first output 26 of the beam-splitter 14 is connected to an end of the first arm 16 and the second output 28 of the beam-splitter 14 is connected to an end of the second arm 18.

The recombination means 20, in the case of FIG. 1, is also a multimode interference coupler.

The recombination means 20 is provided with two inputs 30, 32 and with one output 34. The first input 30 of the recombination means 20 is connected to an end of the first arm 16, this end being opposite to the end which is connected to the first output 26 of the beam-splitter 14. The second input 32 of the recombination means 20 is connected to an end of the second arm 18, this end being opposite to the one which is connected to the beam-splitter 14. The output 34 of the recombination means 20 is connected to the output waveguide 22.

Both arms 16, 18 are made in the form of waveguides having a refractive index allowing propagation of a light wave.

The first arm 16 includes a first electro-absorption modulator 36.

An electro-absorption modulator is often designated by the acronym EAM which refers to an <<electro-absorption modulator>>. Such a modulator is a semi-conductor device able to modulate the intensity of a laser beam via an electric voltage. Its operating principle is based for example on the Quantum Confined Starck Effect (QCSE), i.e. a change in the absorption spectrum of the modulator caused by an applied electric field.

The first electro-absorption modulator 36 comprises a first P-doped semi-conductor area 38, a first N-doped semi-conductor area 40 and a first active portion 42.

The first P-doped semi-conductor area 38 is for example in indium phosphide (chemical formula InP) P-doped with zinc or any other type of P dopant.

The first N-doped semi-conductor area 40 is for example in indium phosphide, N-doped with silicon or any other type of N dopant.

The first active portion 42 is connected to the two first semi-conductor areas 38, 40.

The first active portion 42 generally consists of a plurality of quantum wells. A quantum well refers to a heterostructure of semi-conductors, the behavior of which is close to theoretical potential wells.

The first electro-absorption modulator 36 comprises a first connector for introducing a DC voltage 44.

The first P-doped semi-conductor area 38 is in electric contact with the first connector for introducing a DC voltage 44.

The first electro-absorption modulator 36 also includes a connector for introducing an electric modulation 46.

The connector for introducing an electric modulation 46 is in electric contact with the first N-doped semi-conductor area 40.

The second arm 18 includes a phase shifter 48 and a second electro-absorption modulator 50 different from the first electro-absorption modulator 36.

This phase shifter 48 is able to introduce a shift of π on the phase of an incident optical beam.

According to the example of FIG. 1, the phase shifter 48 is placed upstream from the second electro-absorption modulator 50.

Alternatively, the phase shifter 48 is placed downstream from the second electro-absorption modulator 50.

The second electro-absorption modulator 50 comprises a second P-doped semi-conductor area 52, a second N-doped semi-conductor area 54 and a second active portion 56.

The second P-doped semi-conductor area 52 is for example in the same material as the first P-doped semi-conductor area 38.

The second P-doped semi-conductor area 52 is in electric contact with the first N-doped semi-conductor area 40 and the connector for introducing an electric modulation 46.

The second N-doped semi-conductor area 54 is for example in the same material as the first N-doped semi-conductor area 40.

The second electro-absorption modulator 50 also includes a second connector for introducing a DC voltage 58.

The second N-doped semi-conductor area 54 is in electric contact with the second connector for introducing a DC voltage 58.

The second active portion 56 connects both second semi-conductor areas 52, 54.

The modulation device 10 comprises a modulated voltage generator 60 and two DC voltage sources 62, 64.

The modulated voltage generator 60 is connected to the connector for introducing an electric modulation 46.

The modulated voltage generator 60 is able to apply modulation at the connector for introducing an electric modulation 46.

According to the example of FIG. 1, the electric modulation is a periodic square-wave modulation.

According to another embodiment, the modulation is random (binary data).

Alternatively, the modulated voltage generator 60 is able to apply a periodic sinusoidal modulation.

According to still another alternative, the modulated voltage generator 60 is able to apply a signal including one or more sinusoidal carriers and analog or binary data. Thus, the modulated voltage generator is able to apply signals from mobile stations in communications protocols such as Wi-Fi or Wi-Max.

The first DC voltage source 62 is connected to the first connector for introducing a DC voltage 44.

The first DC voltage source 62 is able to deliver a DC voltage to the first electro-absorption modulator 36. In this case, the DC voltage amounts to −2 volts (V).

The second DC voltage source 64 is able to deliver a DC voltage to the second electro-absorption modulator 50.

The DC voltage applied by the second DC voltage source 64 is opposite to the DC voltage applied by the first voltage source 62. In this case, the DC voltage applied by the second DC voltage source 64 amounts to +2V.

The operation of the modulation device 10 will now be described with reference to FIG. 2.

The modulation device 10 is illuminated by a light beam. This beam for example stems from a laser. This beam is introduced at the input waveguide 12 and then split at the beam-splitter 14 into two light beams F1 and F2.

The first beam F1 is guided on a portion of the first arm 16 towards the first electro-absorption modulator 36.

The second beam F2 is guided on a portion of the second arm 18 and passes through the phase shifter 48. The phase shifter 48 introduces a shift of π in the phase of the electric field of this second beam F2. This second beam F2 is then guided on another portion of the second arm 18 towards the second electro-absorption modulator 50.

The modulated voltage generator 60 applies a periodic squarewave voltage on the connector for introducing a modulation 46. The squarewave voltage is illustrated by the curve 68 on the graph of FIG. 2.

This square voltage has a high level, a low level and a duty cycle of 0.5. The high level corresponds to 2V and the low level to −2V.

The average value of the square voltage is equal to the potential difference between the DC voltage delivered by the second DC voltage source 64 and the DC voltage delivered by the first DC voltage source 62.

In this case, the average value of the applied square voltage is zero.

When the applied square voltage is at a low level, the second electro-absorption modulator 50 is subject to a voltage of 2V on the side of the connector for introducing a DC voltage 58 and to a voltage of −2V on the side of the connector for introducing an electric modulation 46.

According to the curve 70 which illustrates the variation of the optical transmission versus the applied modulation for the second electro-absorption modulator 50 (also called a transfer curve of the second electro-absorption modulator 50), the potential difference of 4V applied to the second electro-absorption modulator 50 turns on the second electro-absorption modulator 50. The associated operating point in FIG. 2 is the point 72. The beam F2 is then transmitted at more than 80%.

The first electro-absorption modulator 36 is subject to a voltage of −2V on the side of the first connector for introducing a DC voltage 44 and on the side of the connector for introducing an electric modulation 46. No electric power is provided to the first electro-absorption modulator 36. According to the curve 74 which illustrates the variation of the optical transmission versus the applied modulation for the first electro-absorption modulator 36, the first beam F1 is absorbed by the first electro-absorption modulator 36. This corresponds to the operating point 76 in FIG. 2.

The recombination means 20 is therefore only illuminated by the second beam F2 which is entirely transmitted to the output waveguide 22. At the output of the modulation device 10, when the square voltage is at a low level, only the second beam F2 which was phase-shifted by π and has passed through the second electro-absorption modulator 50 is therefore transmitted.

When the applied square voltage is at a low level, the first electro-absorption modulator 36 is subject to a voltage of −2V on the side of the first connector for introducing a DC voltage 44 and to a voltage of 2V on the side of the connector for introducing electric modulation 46.

According to the curve 74 which illustrates the variation of the optical transmission versus the applied modulation for the first electro-absorption modulator 36, the potential difference of 4V applied to the first electro-absorption modulator 36 turns on the first electro-absorption modulator 36. The associated operating point in FIG. 2 is the point 78. The beam F1 is then transmitted at more than 80%.

The second electro-absorption modulator 50 is subject to a voltage of 2V on the side of the second connector for introducing a DC voltage 58 and on the side of the connector for introducing electric modulation 46. No electric power is provided to the second electro-absorption modulator 50. The second beam F2 is absorbed by the second electro-absorption modulator 50. This corresponds to the operating point 80 in FIG. 2.

The recombination means 20 is therefore only illuminated by the first beam F1 which is entirely transmitted to the output waveguide 22. At the output of the modulation device 10, when the square voltage is at a low level, only the first beam F1 which is passed through the first electro-absorption modulator 36 is therefore transmitted.

The modulation device 10 therefore has two operating modes: a first mode in which the first electro-absorption modulator 36 is on and the second electro-absorption modulator 50 is off and a second mode in which the first electro-absorption modulator 36 is off and the second electro-absorption modulator 50 is on.

The switching from the first mode to the second mode is controlled by the applied modulation at the connector for introducing an electric modulation 46.

As the data transmitted by the second electro-absorption modulator are phase shifted by π, the modulation device 10 illustrated in FIG. 1 is particularly adapted for producing vectorial modulation.

As an example, the modulation device 10 is well adapted for producing a binary modulation by a phase shift (BPSK modulation).

Further, it should be noted that such an operation of the modulation device 10 is retained for different voltages at the crossing of the optical transmission-voltage curves 70, 74 by assuming that the electro-absorption effects of the electro-absorption modulators 36, 50 are accessible by introducing a voltage into the connector for introducing an electric modulation 46.

The modulation device 10 has the advantage of being of a relatively limited size. Typically, the modulation device 10 extends over fifty microns (μm).

Further, the modulation applied to the connector for introducing electric modulation 46 has an average voltage equal to the arithmetic mean of the DC voltages applied at both connectors for introducing a DC voltage 44, 58. In the particular case shown, the average voltage is zero.

The result of this is that the electric power consumption of the modulation device 10 is lower than the electric power consumption of a modulator of the Mach-Zehnder type produced in a technology based on lithium niobate.

Further, the modulation device 10 is compatible with telecommunications networks with high data communication throughput. Notably, the modulation device 10 may be used for throughputs of 25 gigabauds to 64 gigabauds and more by means of the wide bandwidth which the electro-absorption modulators 36, 50 have.

Finally, the modulation device 10 is easy to apply. Indeed, the modulation device 10 comprises only three connectors: a single connector for introducing an electric modulation 46 and two connectors for introducing a DC voltage 44, 58.

Thus, with only three voltage sources, the first DC voltage source 62, the second DC voltage source 64 and the modulated voltage generator 60, it is possible to control both electro-absorption modulators 36, 50.

As a comparison, in the modulation device of document US-A-2008/0231933, one radiofrequency input is required per modulator. For producing it, a radiofrequency connector is most often used, which leads to a high cost. The proposed modulation device 10 is therefore less expensive and easier to manufacture than the modulation device of document US-A-2008/0231933

FIG. 3 illustrates a second embodiment for the modulation device 10. The elements of the modulation device 10 according to the second embodiment which are common with the first embodiment are not repeated. Only the differences are shown.

In the example of FIG. 3, the modulation device 10 comprises a resistor 82.

The resistor 82 is connected through one of its terminals to the connector for introducing an electric modulation 46 and through the other terminal to the electric ground.

The operation of this second embodiment is similar to the operation of the first embodiment illustrated by FIG. 1.

The use of the additional resistor 82 allows impedance matching between the two electro-absorption modulators 36, 50 and the modulation device 10.

An optical circuit 100 is shown in FIG. 4.

The optical circuit 100 comprises a modulation device 10 according to a third embodiment and a light source 102 able to inject light into the modulation device 10.

The optical circuit 100 is integrated. With this term, it is meant that the modulation device 10 and the light source 102 are made with at least one common layer, for example a common substrate.

The light source 102 according to the example of FIG. 4 is a distributed feedback laser. In such a laser, stimulated emission is resonant by Bragg diffraction and the required feedback for laser emission is distributed over the whole of the perturbation included in the active medium. Distributed feedback lasers (DFB lasers) allow stable emission.

The elements of the modulation device 10 according to the third embodiment which are common with the first embodiment are not repeated. Only the differences are shown.

In the example of FIG. 4, the modulation device 10 comprises a resistor 84 and a capacitor 86 placed in series.

The resistor 84 is connected through one of its terminals to the connector for introducing electric modulation 46 and through the other terminal to a terminal of the capacitor 86. The other terminal of the capacitor 86 is connected to ground.

The connector for introducing a DC voltage 58 of the second electro-absorption modulator 50 is connected to ground. In this embodiment, the modulation device 10 does not include any second DC voltage source.

Further, the first DC voltage source 62 is adapted for delivering a voltage of −4 V while the modulated voltage generator 60 is able to apply a modulation for which the average value is −2 V.

The operation of this third embodiment is similar to the operation of the first embodiment illustrated by FIG. 1.

According to this third embodiment, a single DC voltage source 62 is used. This further simplifies the application of the modulation device 10.

Further, with the integrated light source 102, the proposed optical circuit has the advantage of being easy to manufacture. This will be better understood by means of the diagram of FIG. 5.

This diagram illustrates a sectional view of a portion of the optical circuit 100.

The optical circuit 100 includes a substrate 104 and an electric connection 106.

The substrate 104 is in a semi-conductor. For example, the substrate 104 is in N-doped indium phosphide.

The electric connection 106 is a lower conductive layer in metal. The electric connection 106 is connected to ground.

The optical circuit 100 also includes insulating layers 108, 110 partly covering the substrate 104.

The insulating layers 108, 110 are insulating layers in indium phosphide.

On a first insulating layer 108, are found both electro-absorption modulators 36, 50. This means that the first insulating layer 108 is surmounted with two stacks 112, 114 of superposed layers: a first stack 112 of the first P-doped semi-conductor area 38, the first active portion 42 and the first N-doped semi-conductor area 40 and a second stack 114 of the second P-doped semi-conductor area 52, a second active portion 56 and a second N-doped semi-conductor area 54.

On the second insulating layer 110, is found the light source 102. This means that the first insulating layer 108 is surmounted with a P-doped semi-conductive layer 116 and an N-doped semi-conductor area 118.

The optical circuit 100 also includes electric connections 120, 122, 124, 126 and 128 in the form of metal contacts.

More specifically, the optical circuit 100 comprises an electric connection 120 between the first P-doped semi-conductor area 38 and the first connector for introducing a DC voltage 44.

The optical circuit 100 also comprises an electric connection 122 between the first N-doped semi-conductor area 40, the connector for introducing electric modulation 46 and the second P-doped semi-conductor area 52.

The optical circuit 100 also comprises an electric connection 124 between the second N-doped semi-conductor area 54 and the substrate 104, the electric potential of which is ground.

The optical circuit 100 also comprises an electric connection 126 between the P-doped semi-conductor area 116 of the light source 102 and the substrate 104.

The optical circuit 100 also comprises a connector 130 for supplying voltage to the light source 102 and an electric connection 128 between the N-doped semi-conductor area 118 of the light source 102 and the connector 130 for supplying voltage to the light source 102.

The manufacturing of the optical circuit 100 involves the making of utmost six electric connections 106, 120, 122, 124, 126 and 128.

Consequently, the method for manufacturing the optical circuit 100 is easy to apply.

According to an alternative, the substrate 104 is in silicon and the semi-conductor areas 38, 40, 50 and 52 of both electro-absorption modulators are in a semi-conductor material of the "III-V" type. A semi-conductor of the "III-V" type is a composite semi-conductor made from one or several elements of Column III of the Periodic Table of the Elements (boron, aluminium, gallium, indium, . . . ) and from one or several elements of Column V or pnictogens (nitrogen, phosphorus, arsenic, antimony . . . ).

Alternatively, the optical circuit 100 includes several modulation devices 10 for generating a modulation by a phase- and amplitude-shift like QPSK. In this case, the optical circuit 100 includes two modulation devices 10 per emission polarization state useful for generating the desired modulation.

According to another embodiment not shown, the first and second P-doped semi-conductor areas are inverted with the first and second N-doped semi-conductor areas which match them.

The operation of a modulation device 10 according to such an embodiment is similar to the operation which was described earlier with reference to FIG. 1.

The invention claimed is:

1. A device for generating a modulation of an optical signal comprising:
a first electro-absorption modulator comprising:
a first P-doped semi-conductor area,
a first N-doped semi-conductor area, and
a first active portion connecting both first semi-conductor areas,
a second electro-absorption modulator comprising:
a second P-doped semi-conductor area in electric contact with the first N-doped semi-conductor area,
a second N-doped semi-conductor area, and
a second active portion connecting both second semi-conductor areas, and
a connector for introducing electric modulation,
wherein the connector for introducing electric modulation is in contact with the first N-doped semi-conductor area and the second P-doped semi-conductor area,
wherein the first electro-absorption modulator comprises a first connector, the first P-doped semi-conductor area being connected to the first connector,
wherein the second electro-absorption modulator comprises a second connector, the second N-doped semi-conductor area being connected to a first end of the second connector, and
wherein the device for generating a modulation further includes a DC voltage source connected to the first connector, and wherein a second end of the second connector is connected only to ground.

2. The device for generating a modulation according to claim 1, wherein the device for generating a modulation includes a modulated voltage generator connected to the connector for introducing an electric modulation, the modulated voltage generator being adapted for applying a periodic sinusoidal or squarewave modulation.

3. The device for generating a modulation according to claim 1, wherein the device for generating a modulation) comprises a load, the load being connected to an electric ground of the device for generating a modulation and to the connector for introducing electric modulation.

4. The device for generating a modulation according to claim 3, wherein the load is a resistor or a resistor in series with a capacitor.

5. An optical circuit including:
at least one device for generating a modulation of an optical signal according to claim 1, and
a light source able to inject light into the device(s) for generating a modulation.

6. The optical circuit according to claim 5, wherein the light source is a distributed feedback laser.

7. A method for manufacturing the optical circuit according to claim 5, the method comprising the steps of:
making semi-conductor areas of the device for generating a modulation,
making semi-conductor areas of the light source,
making at most six electric connections between the semi-conductor areas of the device for generating a modulation and the semi-conductor areas of the light source.

8. The method according to claim 7, wherein the electric connections are metal contacts.

9. A method for generating a modulation of an optical signal comprising using the device according to claim 1.

10. The method according to claim 9, wherein the modulation is a binary phase shift modulation.

11. A method for manufacturing the optical circuit according to claim 6, the method comprising the steps of:
making semi-conductor areas of the device for generating a modulation,
making semi-conductor areas of the light source,
making at most six electric connections between the semi-conductor areas of the device for generating a modulation and the semi-conductor areas of the light source.

12. The method according to claim 11, wherein the electric connections are metal contacts.

13. A device for generating a modulation of an optical signal according to claim 1 of an optical circuit wherein the second connector is connected only to ground for producing vectorial modulation.

* * * * *